April 10, 1934. R. C. BICKERSTAFF 1,954,036
AUTOMATIC HYDRAULIC MOLDING PRESS
Filed Oct. 24, 1929 6 Sheets-Sheet 1
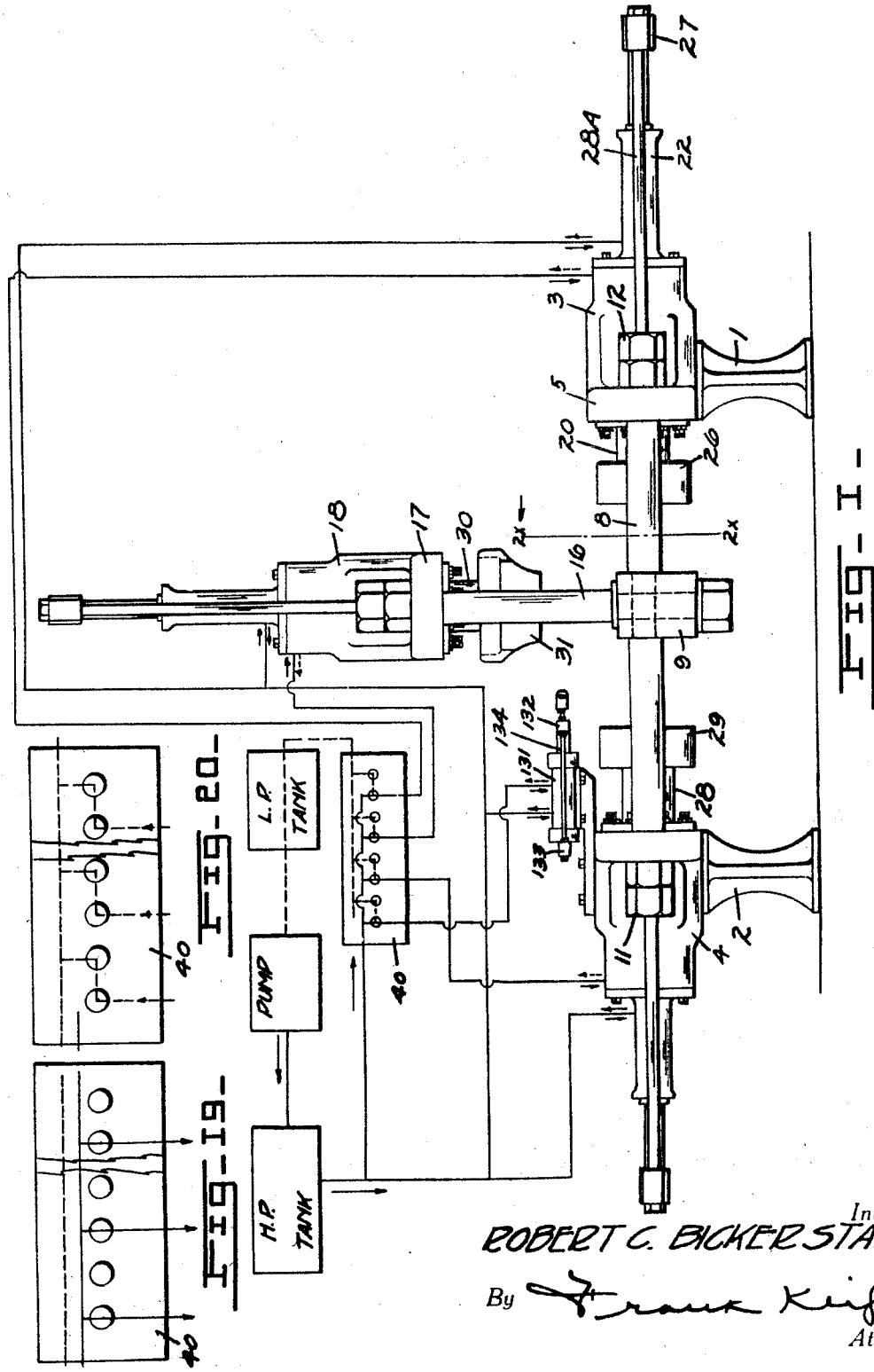
Inventor
ROBERT C. BICKERSTAFF
By Frank Keifer
Attorney April 10, 1934.  R. C. BICKERSTAFF  1,954,036
AUTOMATIC HYDRAULIC MOLDING PRESS
Filed Oct. 24, 1929  6 Sheets-Sheet 2
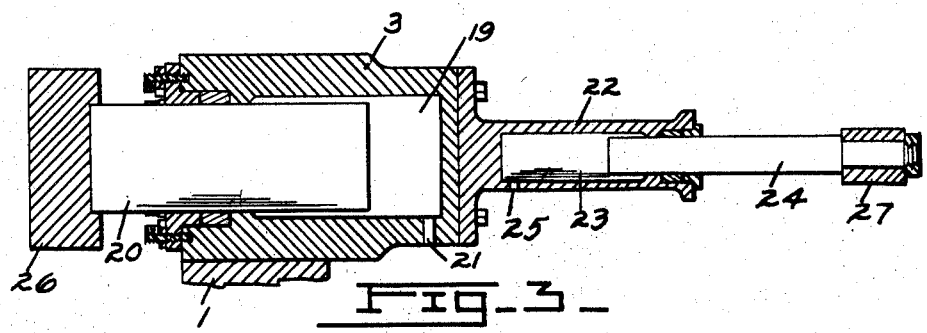
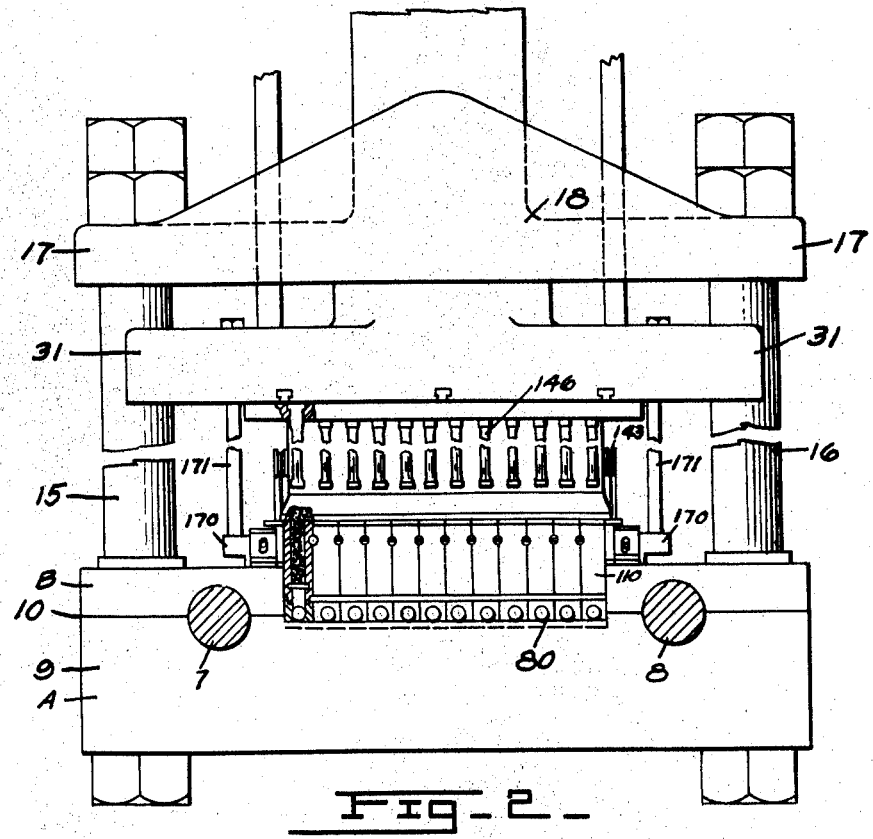
Inventor
ROBERT C. BICKERSTAFF
By Frank Kiefer
Attorney April 10, 1934.  R. C. BICKERSTAFF  1,954,036
AUTOMATIC HYDRAULIC MOLDING PRESS
Filed Oct. 24, 1929  6 Sheets-Sheet 3
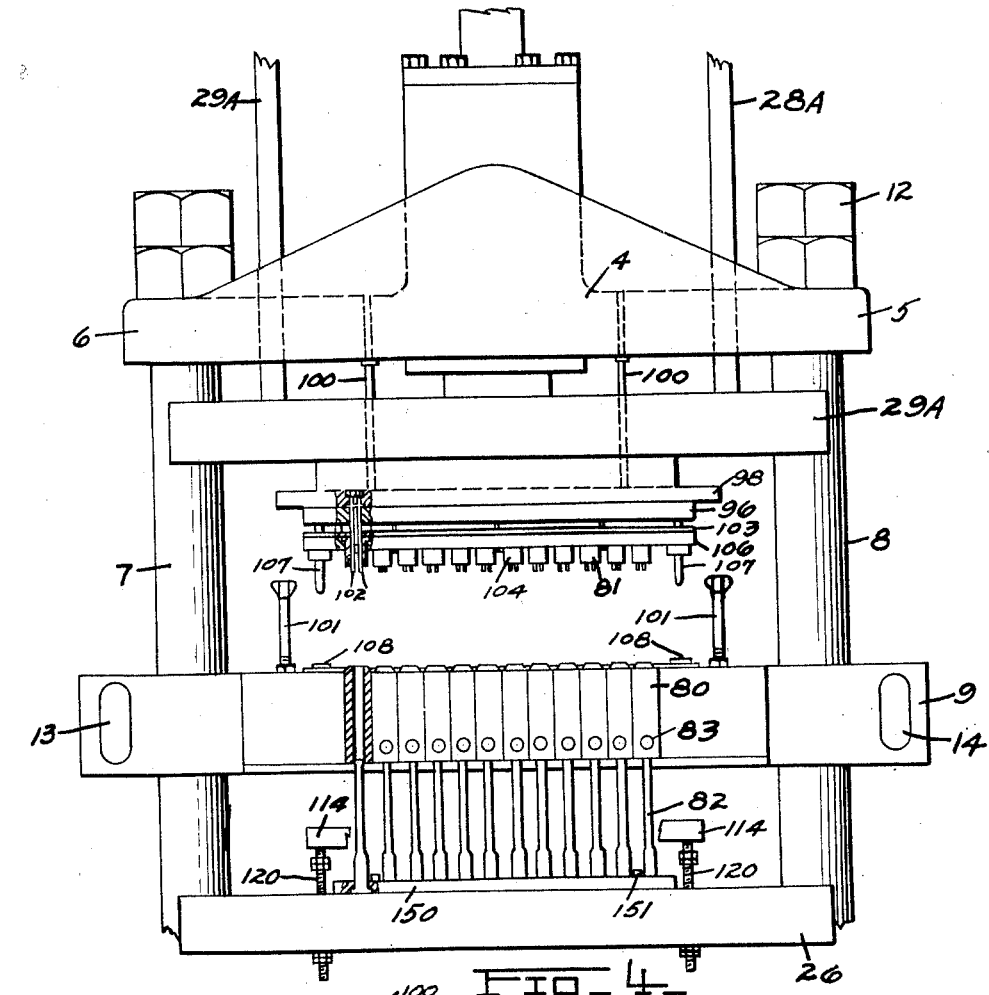
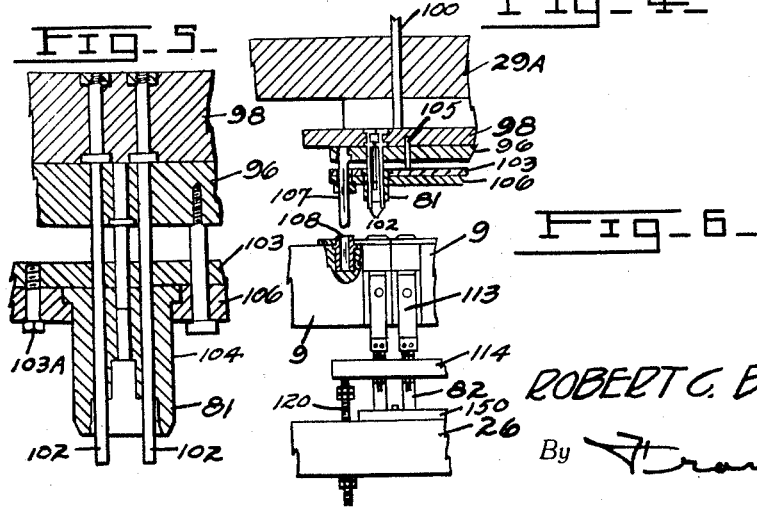
Inventor
ROBERT C. BICKERSTAFF
By Frank Keifer
Attorney April 10, 1934.  R. C. BICKERSTAFF  1,954,036
AUTOMATIC HYDRAULIC MOLDING PRESS
Filed Oct. 24, 1929  6 Sheets-Sheet 4
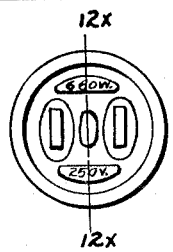
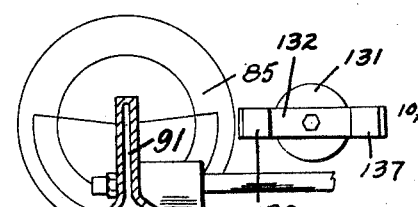
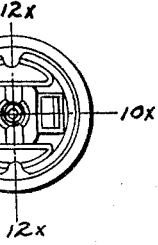
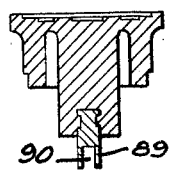
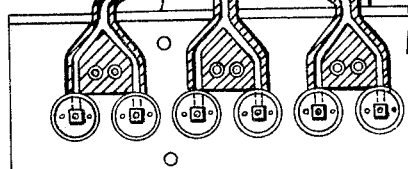
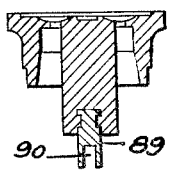
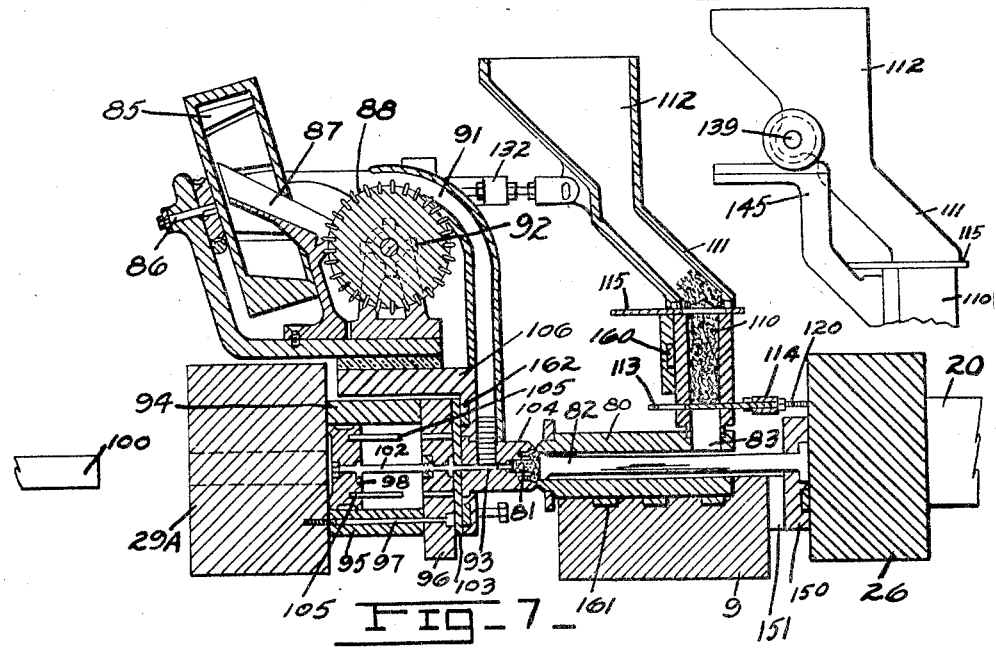
Inventor
ROBERT C. BICKERSTAFF
By Frank Kiefer
Attorney April 10, 1934. R. C. BICKERSTAFF 1,954,036
AUTOMATIC HYDRAULIC MOLDING PRESS
Filed Oct. 24, 1929 6 Sheets-Sheet 5
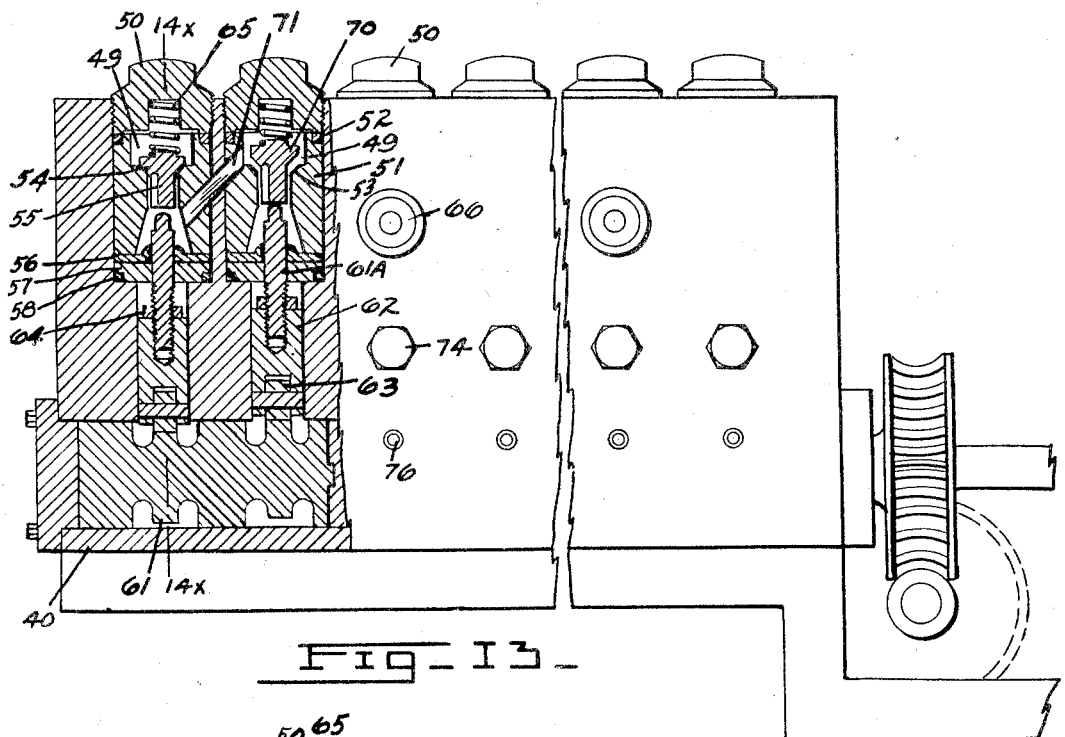
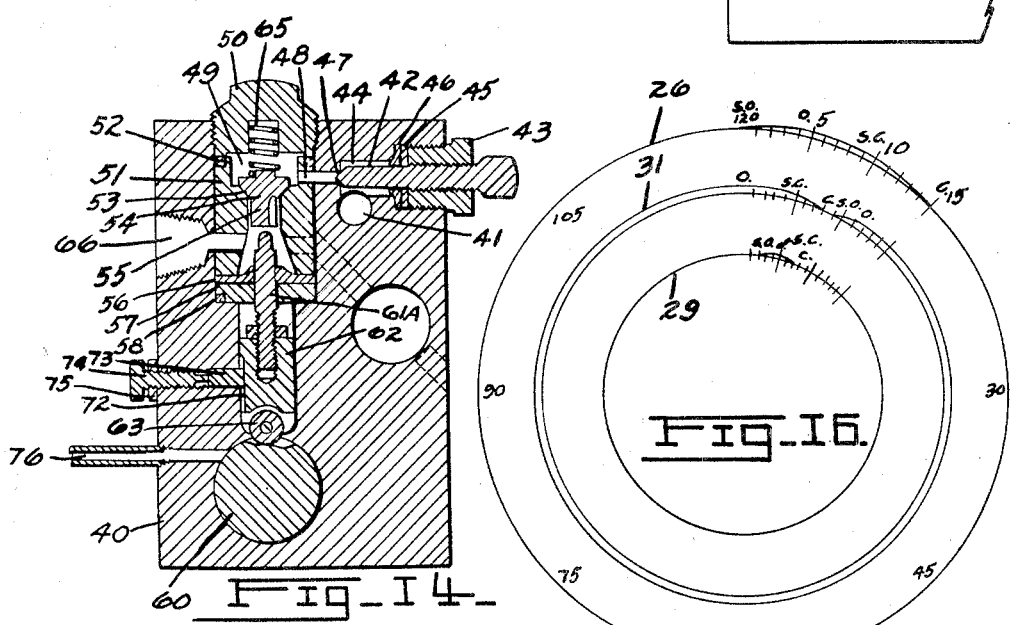
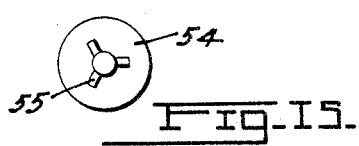
Inventor
ROBERT C. BICKERSTAFF
By Frank Keifer
Attorney April 10, 1934.                R. C. BICKERSTAFF                1,954,036
                        AUTOMATIC HYDRAULIC MOLDING PRESS
                    Filed Oct. 24, 1929          6 Sheets-Sheet 6
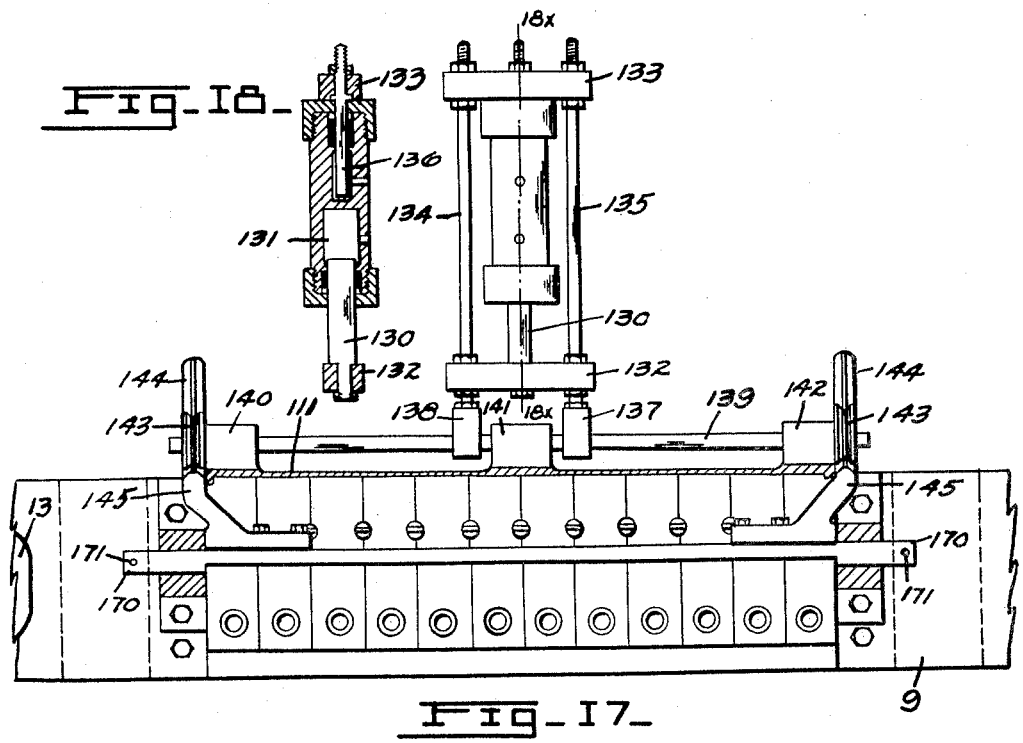
Inventor
ROBERT C. BICKERSTAFF
By Frank Keifer
                    Attorney Patented Apr. 10, 1934

1,954,036

UNITED STATES PATENT OFFICE 1,954,036

AUTOMATIC HYDRAULIC MOLDING PRESS

Robert C. Bickerstaff, Rochester, N. Y., assignor to U. S. Plastic Molders Mfg. Corp., Buffalo, N. Y., a corporation of New York Application October 24, 1929, Serial No. 402,198

13 Claims. (Cl. 18—16)

The object of this invention is to provide a new and improved form of a press for molding articles from bakelite or similar compositions.

Another object of the invention is to provide a press for molding articles that will be operated by hydraulic power.

Another object of the invention is to provide a press having a stationary platen and a moving platen on either side thereof all of which platens cooperate to press the raw material into the shape of the finished product.

Another object of the invention is to provide a press having a stationary platen with a moving platen above it which cooperates therewith to secure the feed of the material.

Another object of the invention is to provide a press having a platen which is moved in one direction by a large piston and is moved in the reverse direction by a small piston, the large piston being intermittently exposed to hydraulic pressure and the small piston being constantly exposed to hydraulic pressure.

Another object of the invention is to operate the various platens of the press by a combination of valves that will be operated in a regular sequence by a rotating cam shaft.

Another object of the invention is to heat the material just before it is fed to the dies and then quickly apply the pressure thereto in the dies and hold the material under pressure during a much longer interval of time while the material is curing.

These and other objects of the invention will be illustrated in the drawings, described in the specification and pointed out in the claims at the end thereof.

In the drawings:

Figure 1 is a side elevation of the press and a diagrammatic view of the pipes and valves by which the various parts of the press will be operated by hydraulic power.

Figure 2 is a vertical section on the line 2x, 2x of Figure 1.

Figure 3 is a longitudinal section through any one of the three large hydraulic cylinder units of the press.

Figure 4 is a plan view of the stationary platen and the two moving platens on either side thereof.

Figure 5 is an enlarged sectional view of one of the unit dies of the press and the knockout operating in connection therewith.

Figure 6 is a detail view of the stationary and the two moving platens shown in Figure 4 with the two moving platens brought closer to the stationary platen.

Figure 7 is a vertical section through one of the unit dies showing the machanism for feeding the granulated material and the metal inserts thereto.

Figure 7A is a side elevation of one of the hoppers.

Figure 8 is a vertical section through the chutes that feed the metal inserts to six of the dies.

Figure 9 is a rear elevation of the finished piece that is made by the die.

Figure 10 is a horizontal section on the line 10x, 10x of Figure 9.

Figure 11 is a front elevation of the piece shown in Figure 9.

Figure 12 is a section on the line 12x, 12x of Figure 11.

Figure 13 is an elevation of the valve assembly and the eccentric shaft for operating the valves thereof.

Figure 14 is a vertical section on the line 14x, 14x of Figure 13.

Figure 15 is a bottom plan view of the valve shown in Figures 13 and 14.

Figure 16 is a diagrammatic view showing the program according to which the valves are opened and closed, and the platens for operating.

Figure 17 is a top plan view of the stationary platen with the hoppers mostly cut away.

Figure 18 is a vertical section on the line 18x, 18x of Figure 17.

Figure 19 is a diagrammatic view showing the flow of the liquid through the valves into each of the large cylinders for the purpose of moving the large pistons out.

Figure 20 is a diagrammatic view of the valves showing the flow of the liquid through the valves from each of the large cylinders when the pistons are drawn back.

In the drawings like reference numerals indicate like parts.

In the drawings reference numerals 1 and 2 indicate pedestals on which my press is mounted. On the pedestal 1 is mounted the cylinder frame 3 and on the pedestal 2 is mounted the cylinder frame 4. On either side of the cylinder frames 3 and 4 are the extensions 5 and 6 which are perforated and between which extend the tie rods 7 and 8 by which the cylinder frames 3 and 4 are held together. These tie rods are reduced in diameter at the central part thereof and on them rests the stationary platen 9 which is divided into two parts A and B which parts are separated on the line 10 see Figure 2. The platen 9 has openings therein through which the reduced parts of the tie rods 7 and 8 extend. The two halves of the platen positively engage from opposite sides with the reduced parts of the tie rods 7 and 8 and lock between them on the shoulders on the tie rods and the platen 9 is thus securely held in place. The tie rods 7 and 8 have reduced ends on each end thereof that form shoulders thereon. These tie rods 7 and 8 pass through the extensions 5 and 6 on the cylinder frame and the shoulders formed by the reduced ends of the tie rods engage against the extensions 5 and 6 by which the cylinder frames are positively spaced apart. The nuts 11 and 12 securely clamp the cylinder frames with their extensions against the shoulders on the tie rods. In this way the horizontal members of the press are joined together.

The stationary platen 9 has two slots 13 and 14 therein through which extend the upright tie rods 15 and 16. These tie rods have shoulders and reduced ends on each end thereof so that they make positive engagement with the stationary platen at the lower end and with the extensions 17 on the cylinder frame 18 at the upper end thereof. In this way the upright portion of the frame of the press is attached to the horizontal portion of the press.

As shown in Figure 3 in the cylinder frame 3 a cylinder 19 is provided in which a piston 20 is mounted to move by hydraulic pressure. The oil or other fluid is admitted to the cylinder 19 through the opening 21. Fastened to the end of the cylinder frame 3 is a smaller cylinder frame 22 in which a cylinder 23 is formed. The cylinder 23 is much smaller than the cylinder 19. In this cylinder is provided a piston 24 which is also moved by hydraulic pressure, the liquid being admitted to the cylinder 23 through the opening 25. Each of the pistons 20 and 24 are surrounded by a stuffing box which holds the liquid in the cylinder and prevents leakage. The cylinders and pistons in each of the two horizontal cylinder frames and in the upright cylinder frame are all substantially like the one shown in section in Figure 3 except that the large piston that moves in the horizontal cylinder frame 3 is about 1/8th inch larger in diameter than the large piston that moves in the horizontal cylinder frame 4 and the upright cylinder frame 18. The small pistons in each case are substantially of the same diameter. It will also be understood that the large piston in each case has about three times the diameter of the small piston. It will also be understood that the large piston and the small piston in each case are positively coupled together and will move forward and back together. For this purpose the moving platen 26 is positively connected to the cross head 27 by the tie rods 28—A and 29A, so that as the platen 26 moves down with its piston 20 the cross head 27 will move down as well and the small piston 24 will move with it and will be forced into the small cylinder 23 against the same pressure per square inch as causes the large piston 20 to move out of its cylinder 19.

At the end of the stroke the valve that controls the inlet 21 is moved to shut off the entrance of liquid into the large cylinder 19 under pressure and to permit the drainage of the liquid therefrom, whereupon the high pressure liquid in the small cylinder 23 will cause the piston 24 to move back and will restore the small piston 24 and large piston 20 and the platen 26 to their normal open position. That is, the position that they occupy before the press closes the moving platens against the stationary platen 9. As shown in Fig. 1 in the cylinder frame 3 the piston 20 operates to move the platen 26.

In the cylinder frame 4 the piston 28 operates to move the platen 29. In the cylinder frame 18 the piston 30 operates to move the platen 31.

The regular operation of the press is through a cycle that lasts about two minutes or 120 seconds. The platen 31 of the upright portion of the press remains closed on the platen 9 for about one second and remains stationary in open position for about 113 seconds and of the balance of the time about four seconds are used in the closing of the platen 31 on the platen 9 and about two seconds are used in opening the platen 31 or moving it back from the platen 9. The platen 29 remains closed on the platen 9 for about 115 seconds, and two seconds are consumed in opening the platen 29 or moving it back from the platen 9, and three seconds are consumed in immediately thereafter closing it on the platen 9. The platen 26 remains closed on the platen 9 one hundred and five seconds and four seconds are spent in bringing it from closed position to open position or away from the platen 9. It then remains open five seconds and six seconds are spent in bringing it from open positon to closed position.

The sequence of operation and its coordination of the platens is illustrated on the circular diagram shown in Figure 16 and the mechanism by which the movement of the valves is controlled and properly timed to open and close the platens 26, 29 and 31 on the platen 9 will now be described.

It will be understood, however, that the above timing may be varied within wide limits according to the needs for the various pieces that the press may be called upon to make.

On Figure 16 the letters S. O. means starts to open; O means open; S. C. means starts to close, and C means closed. This refers to the valves and the platens controlled thereby, the platens being indicated by reference numerals on the circles.

In Figures 13 and 14 I have shown a sectional view of the block 40 in which the valves are mounted to move. In this block are provided four pairs of valves. In Figure 13 the block is shown partly broken away in section for the purpose of shortening the figure by the space that would otherwise be taken up by the two valves that are omitted therefrom. In Figure 1 the eight valves are diagrammatically shown.

One of the valves of each pair is provided to regulate the admission of oil under high pressure into the large cylinders and the other valve of each pair is provided to regulate the escape of the oil from the large cylinders. The first and second valves are used to control the feed of oil to the large and small cylinders that operate the hopper feeding devices shown in Figures 7 and 17. The remaining valves control the feed of oil to the cylinders in the frames 3, 4 and 18, which cylinders are used to operate the platens. It will also be understood that the valves are all of the same size. The cylinders and pistons that are used to operate the feeding devices are relatively much smaller than the cylinders and pistons that operate the platens.

The intake 41 of each high pressure valve is partially closed by a throttling screw 42. This is mounted in a bushing 43 in an opening 44 which bushing presses on a washer 45 and packing 46.

The packing 46 prevents the escape of the high pressure liquid. The screw 42 has a cone shaped end which is placed near the seat 47 in the passageway but does not completely close on the seat. The opening between the end of the screw and the seat is large enough to permit the liquid to pass fast enough to cause the pistons to move the platens fast enough to secure proper functioning of the press. The oil passes through the port 48 into the chamber 49 formed between the plug or cap 50 which closes the outer end of the chamber and the valve housing 51. Between the cap 50 and the valve housing 51 is provided a packing ring 52.

The valve housing 51 is provided with a seat 53 on which normally rests a valve 54. This valve has a fluted stem 55 as shown in Figures 13, 14 and 15 which extends down through the valve housing. The lower end of the valve housing rests on a soft packing 56 which in turn rests against the washer or collar 57. This collar on the lower side is grooved to receive the annular end of the packing strip 58. All these parts are held in place by the cap 50, which is threaded into the block and puts ample pressure on the various parts to securely hold them in place and secure tight joints between them.

In the bottom of the block is provided the cam or eccentric shaft 60 on which is formed a cam 61 for each of the eight valves. This cam shaft makes one revolution for each cycle of the press. It will be seen that the cam shaft 60 is divided into two parts which are connected by a tongue and groove joint, so that they rotate in unison. This is necessary so that the valves will operate in the proper sequence and will be properly timed to secure the coordination of the platens in the molding of the bakelite or other material into the finished product. The short section carries the cams that operate the valves that control the movement of the feeding device and the long section carries the cams that controls the movements of the platens. Each of these sections can be removed independent of the other section and replaced by other sections that will change the timing of the valves and thus change the feed of the material and the timing of the platens 26, 29 and 31. This is necessary when articles of different size, shape and color are molded by the press.

Through the packing 56 and the collar 57 passes a stem 61A which is threaded into a sleeve 62 which carries an anti-friction roller 63 on the lower end thereof. This roller is engaged by the cam 61 on the shaft 60. The stem 61A is threaded into the sleeve 62 and is locked in place thereon by the nut 64. All these parts form a tappet which is used to lift the valve 54. The valve 54 is normally held on its seat by the spring 65 and by the pressure of the liquid as well.

When the valve 54 is lifted, the liquid passes between the valve and the valve seat and along the fluted stem of the valve and out through the opening 66 into the pipe that conveys the liquid to the large high pressure cylinder. The exhaust from the large high pressure cylinder in each case is controlled by the valve 70. The liquid in each case flows in the reverse direction through the port 66 and port 71 past the valve 70 when it is lifted by its cam on the shaft 60.

It will be understood that when the valve 54 is lifted to admit the high pressure liquid to the big high pressure cylinder its companion valve 70 remains closed and holds the liquid under the pressure in the big cylinder while the press is functioning with its high pressure. Thereafter the valve 70 opens and the big cylinder is allowed to drain. It will also be understood that the small cylinders 23 in Figure 3 etc. are always connected with the reservoir in which the high pressure liquid is stored and as the large piston 20 in Figure 3 is moved out, the small piston 24 is forced into its cylinder and the liquid contained in the cylinder is forced back into the reservoir, and when the large cylinder 19 is drained the high pressure liquid flows from the reservoir into the cylinder 23 and pushes the piston 24 out causing the piston 20 to be pushed into its cylinder forcing the oil therein out therefrom into a receiving reservoir from which it is pumped into the high pressure reservoir so that it can be used over again.

It will be further understood that there are no valves between the small cylinders 23 and the high pressure reservoir. The liquid flows back and forth from the high pressure reservoir into the small cylinders and out again into the high pressure reservoir at will during the operation of the press as above described.

The sleeve 62 is held against turning so that the antifriction roller 63 will always bear properly against the cam on the shaft 60 by the following arrangement. The sleeve 62 has a flat surface cut therein at 72 and against this flat surface bears a block 73. This block has a flat surface on the end thereof which is adapted to bear against the flat surface on the sleeve 72 and keep it from turning. The block 73 is held against the flat surface by means of the screw 74 and the screw 74 is locked into position by the lock nut 75.

Below each tappet a drain 76 is provided so that in case the liquid should leak past the packing because of the high pressure, the waste liquid can readily escape from the block.

As shown in Figures 2 and 4 the press is provided with 12 dies although it will be understood that any convenient number of dies may be provided on the press. The dies in each case make duplicate parts or parts that can be made in the same operation of the press. Each of these dies comprises a female member and a male member. The female member is indicated by the part 81 and is carried on the platen 29 and the male member is indicated by the plunger 82 which is carried on the platen 26. The male member 82 slides in a cylindrical feeding tube 80, which feeding tube 80 makes close contact with the end of the female die 81 when the platens come together, so that the material may be delivered to the female part of the die. The material is fed into the tube 80 through the opening 83 and is pushed through the tube by the male member 82 into the female die 81.

It sometimes happens that a piece is to be molded having an enlarged oval or spherical end and in such case the die must be divided on the line of greatest circumference in order to get the piece out of the die. In such case the end of the tube 80 is used as a part of the die and is shaped to correspond. Ordinarily the male member 82 moves to the end of the tube 80 and stops there so as to push all of the material into the female part of the die, but where the tube 80 is used as part of the female member of the die, the male member 82 will not move to the end of the tube 80 but will stop short of the end far enough to form the piece desired.

In the operation of the press, the platen 29 is moved against the platen 9 so as to bring the members 81 and 80 into contact with each other ready for the molding of the parts. The male members 82 are then moved forward by the platen 26 and operate to push the charge of bakelite or other material into the female member 81 or the die formed by the members 80 and 81 as the case may be, and hold it there until the material has cured and has become hard.

The material is fed into the feeding tube 80 by an apparatus that will now be described.

In the finished product one or more metal parts are usually embodied. These metal parts are contained in a hopper 85 which consists of a cylindrical shell and rotates on the axis 86. As it rotates the metal parts are carried up on one side and are cast into a chute 87 which conveys them against the wheel 88. The wheel 88 has a series of teeth thereon. The metal part 89 of the finished piece is shown in section in Figures 10 and 12. The metal part shown has a socket 90 therein which is adapted to engage on any one of the teeth on the wheel so that it will stand radially thereon. The parts are carried around into the chute 91 by which they are stripped from the wheel and these parts then drop into the chute 91. Preferably this chute is filled up by hand at the start so that when the parts are stripped from the wheel they will fall only a short distance to the top of the pile and will keep the correct relative position in the chute and will not be turned aside therefrom. The chute branches as is shown in Figure 8. The metal parts are cylindrical in cross section and as they are fed down the chute 91 they can go on down the central chute, and when this is full they will roll into the chutes to the right or left and drop into those until they are full, after which they back up into the central chute. One hopper 85 and wheel 88 is thus made to feed six dies as shown in Figure 8. If the chute fills up so that the wheel cannot carry more parts into it, the rotation of the wheel will be stopped thereby and to provide for this the wheel 88 is driven by a friction clutch or washer 92 that is keyed to the shaft and bears against the hub of the wheel with sufficient friction to drive it normally. The friction drive will slip on the hub of the wheel as soon as the wheel encounters the resistance due to the filling of the chute as above described. The metal parts are pushed out from the bottom of the chute one at a time by the slide 93 which is carried on the bar 96 and is moved by the platen 29 in the manner that will presently be described.

On the platen 29 is carried a channel formed of the bars 94 and 95, and 96. The bar 96 is fastened to the platen 29 by means of the screws 97 which pass through the bars 94 and 95 so that all parts are held firmly together. In the opening enclosed between the channel so formed and the platen 29 is provided a bar 98. This bar 98 is free to move back and forth in the open space between the channel and the platen. It is moved forward or rather held against moving back with the platen 29 by the pins 100 carried on the stationary cylinder frame 4. These pins pass through the platen 29 and the forward ends of them are available for holding the bar 98 against backward movement.

When the platen 29 and bar 96 are at the rear end of their movement the pin 93 is withdrawn from the die and this allows the metal piece 89 to fall down in front of the pin 93 and on the forward movement of the pin 93 with the platen, the metal piece 89 is pushed ahead of the pin to its proper place in the die where it can make contact with the material that is to be molded around it. When the material is pressed into the die the pin 93 holds the metal piece 89 in place as the material forms around it. When the part is finished the metal piece is molded or frozen into the bakelite or other material as shown in Figures 10 and 12.

When the platen 29 starts to move forward the bar 98 is in the position shown in Figures 4 and 6. It remains in this position separated from the platen 29 until it encounters the pins 101 carried on the stationary platen 9 by which its forward movement is arrested and it is held against movement while the platen 29 moves forward against it as shown in Figure 7. This bar 98 carries the knockout pins 102 which pass through the bar 96 and the bar 103 and into the die 104. In the position shown in Figure 7 these pins are withdrawn from the die stopping at the edge of the opening in the die so as to completely fill it and thus secure proper molding of the feet by the die.

The bar 98 is shown in Figure 7 in its most forward position. As the platen 29 moves back the bars 94, 95 and 96 move back with it, and the bar 98 also moves back until the bar 98 comes into contact with the pins 100 by which its further backward movement is arrested and it is then held stationary while the platen 29 continues its rearward movement. The bar 98 carries two pins 105 at each end thereof and when the movement of the bar 98 is arrested, these pins 105 pass through suitable openings in the bar 96 and make contact with the bar 103 arresting the backward movement of bar 103 and causing the bar 103 to stand in the position shown in Figure 6. The angle 106 is fastened to the bar 103 by the bolts 103A and these two parts move as one piece. Bolts 106A pass through the angle 106 and bar 103. These bolts are threaded into the bar 96 and move with the platen 29. The bar 103 and angle 106 have a limited sliding engagement on the bolts and are held thereon by the heads of the bolts. Between the bar 103 and the vertical member of the angle 106 are fastened the dies 104 so that the dies move with the bar 103 and the angle 106 which bar and angle are held together by bolts 103A (See Fig. 5). As the dies move rearward against the knockout pins 102 which are held stationary as above described the knockout pins assume the position shown in Figure 5 and knockout the piece that has been molded by the dies. When the platen 29 is at the rear end of its movement the parts will be in a position shown in Figures 5 and 6, and when it is at the forward end of its movement the parts will be in a position shown in Figure 7. The bar 98 carries on each end thereof a pin 107 which engages with a socket 108 on the stationary platen 9 by which the bar 98 is centered with reference to the platen 9 so that the dies 81 will come together true with the feeding tubes 80, thus insuring proper feeding of material through the dies and avoiding the possibility of waste of the material when it is pressed into the dies.

The material is fed to the feeding cylinder through the opening 83 by means of a chute 110 which receives the material through a chute 111 which receives it in turn from a hopper 112. In the chute 110 is a valve 113 which moves in one direction to close the bottom of the chute and hold the material therein and moves in the other direction to open the bottom of the chute so that the material can pass into the feeding tube 80.

The valves 113 are connected to the bar 114 which in turn is connected to the platen 26 by two bolts 120. These bolts pass through the platen and have a limited sliding engagement therewith as shown in Figures 4, 6 and 7. The bolts 120 have nuts thereon on each side of the platen 26 which can be moved together or spaced apart so as to give the desired lost motion between the bar 114 and the platen 26. This permits the bar 114 and valves 113 to remain idle at each end of their movement during a part of the movement of the platen 26 in each direction and causes the bar 114 and the valves to move the rest of the distance with the platen 26.

At the top of the chute 110 is a stationary plate 115 which has an opening therein that always registers with the opening in chute 110. The chute 111 and hopper 112 move to the position shown in Figure 7 and pauses there for a few seconds to permit the chute 110 to fill. It then moves to the left of the position shown in Figure 7 and the bottom of the chute 111 is then closed by the stationary plate 115. The chute 110 then holds a measured quantity of the material. That is just enough to mold the parts with a surplus of about 2%. When the valve 113 moves to the right this material passes down into the feeding tube 80 and is pushed down by the plungers 146 on the platen 31 and is then pushed forward by the plungers 82. The chute 111 and hopper 112 are moved back and forth by a piston 130 which moves in a cylinder 131. This piston is connected to a cross head 132 which in turn is connected to a cross head 133 by the tie rods 134 and 135. The cross head 133 carries a piston 136 of much smaller diameter than the piston 130. As the piston 130 is pushed out of its cylinder the piston 136 is pushed into its cylinder against the same pressure that operates the large piston 130 and the pistons 20, 28 etc. The inlet into the cylinder in which the piston 130 operates is controlled by the first valve in Figure 13 above described, and the outlet for this cylinder is controlled by the second valve shown in Figure 13 as above described. It will be understood that the four pairs of valves shown in Figs. 1 and 13 are all alike, although the pistons and cylinders shown in Figure 17 used for operating the feed hopper are much smaller in diameter than the pistons and cylinders used for operating the platens because much less power is required.

The tie rods 134 and 135 connect to blocks 137 and 138 which in turn connect to the shaft 139 which passes through bearings 140, 141 and 142. On the end of this shaft are wheels 143 which rest on tracks 144 which are carried on brackets 145 at opposite sides of the machine. The hoppers 112 are all connected to the shaft 139 and move back and forth with it. The bottoms of the hoppers slide on the stationary plate 115 as above described, and as the bottom of the chutes 111 register with the openings in the stationary chutes 110 the granular material passes through and fills the chutes 110. When the platen 26 moves it opens the valves 113 and allows the material to pass down. At this instant the hoppers 112 are moved to the left uncovering the upper end of the stationary chutes 110. At this instant the plungers 146 descend and push the material out of the stationary chutes 110 through the opening 83 and into the tubes 80. Thereafter the platen 26 advances and with the plungers 82 pushes the material into the dies.

The dies have previously moved up to position to receive the material and the pressure is exerted on the material to form it into the finished product by the platen 29 acting through the dies 104 and by the platen 26 acting through the plungers 82. The platen 31 does not exert any pressure on the finished piece but merely forces the granular material into the feeding tubes 80. The pressure remains on the finished piece in the die for a hundred seconds or more and then the platen 26 recedes to permit the feeding of a new charge and the platen 29 recedes to permit the knockout to operate to knockout the finished piece and receive a new metal piece after which it again closes up against the stationary platen 9 after which the cycle of the press is repeated indefinitely.

As above stated a small excess of material is fed to the dies and as this material more than fills the die some provision must be made to get rid of the excess material. This is provided for as follows: The piston 20 is a little larger than the piston 28 and consequently exerts more power. When the plunger 82 and dies 104 come together or approach each other, the excess material will prevent the plunger 82 from reaching the end of its stroke. The piston 20 that drives the platen 26 is slightly larger than the piston 28 that drives the platen 29. This pressure communicated through the plungers 82 will force the dies back from the seat on the tubes 80 leaving a clearance between the dies 104 and the tube 80. The end of the plunger 82 does not quite fill the end of the die. An annular space is left between them as much as $\frac{1}{16}''$ across, which space is covered by that portion of the die that is on the tube 80. As the pressure is exerted on the die 104 the die is forced back as much as .007'' so that a clearance is left between it and the end of the tube 80 through which the excess material is squeezed out. As shown in Figure 7 the plunger 82 has reached the end of its travel. This is due to the fact that the bar 150 which carries the plungers 82 also carries blocks 151 which make contact with the stationary platen 9 and limit the travel of the platen 26. As stated, the dies 104 have been forced back by .007'' or thereabouts leaving an opening through which the excess material can flow out under pressure forming a burr and as it flows out the dies 104 move forward again until the burr has been squeezed down to a thickness of about .002'' at which point the material ceases to flow. This burr is so thin that it is easily broken off without marring the finished piece.

It will also be understood that the material is fed into the hoppers 112 at substantially the same temperature as the atmosphere. In order to secure molding, however, the granulated material must be raised to a temperature of 250 degrees F. or more. To heat the material I provide the heating element 160 in the chute 110 and the heating element (steam or electricity) 161 in the platen 9 which makes contact with the feeding tubes 80.

The granulated material dwells in the tube 80 a hundred seconds or more and acquires most of its heat therein. When it passes into the feeding tubes 80 it acquires still more heat so that when it reaches the dies it is about the proper temperature. The dies are also heated by the heating elements 162 so that between all these sources of heat the material will reach the dies in proper condition for molding and curing under pressure.

The feeding tubes 80 will reach a higher temperature than the chute 110. As the material remains in the chute 110 for a hundred seconds or more it is desirable to avoid heating the material to the maximum amount in the chute 110 and to avoid this premature heating to the maximum temperature the chute 110 makes contact with the feeding tube 80 only for a few seconds while the material is passing into the tubes 80. To lift the chutes 110 out of contact with the tubes 80, I provide as follows:

The bar 170 is provided to which the chutes 110 are attached. This bar is in turn attached to the platen 31 by the bolts 171. When the platen 31 lifts, the chutes 110 are moved out of contact with the feeding tubes 80, a sixteenth of an inch or more. The bolts 171 have a sliding connection with the platen 31 so that the bar 170 is not lifted until the platen 31 has nearly reached the upper limit of its movement. In this way the chutes 110 are raised out of contact with the tubes 80 and excessive heating is avoided.

I claim:

1. In a press, the combination of a moving platen, a channel attached to the forward side thereof enclosing a space between it and the platen, a bar in front of the channel, dies fastened to and extending forwardly from said bar, a bar enclosed between the channel and the platen, a stationary platen, pins carried thereon with which the ends of said last named bar are adapted to engage and by which the forward movement of the bar is arrested, knockout pins carried on said bar passing through said dies, means for moving the bar to which the dies are fastened with the moving platen with a lost motion device.

2. In a press, the combination of a moving platen, a channel attached to the forward side thereof enclosing a space with the platen, a bar in front of the channel, dies fastened to and extending forwardly from said bar, a bar enclosed between the channel and the platen, a stationary platen, pins carried thereon with which ends of said last named bar are adapted to engage and by which the forward movement of the bar is arrested, knockout pins carried on said bar passing through said dies, means for arresting the movement of the bar carrying the knockout pins while the other bar carries the dies back on the knockout pins to eject the pieces formed therein.

3. In a press, the combination of a stationary frame, a platen moving thereon, pins mounted on the frame and extending through the platen, a channel mounted on the platen, a bar carried between the channel and the platen and free to move back and forth therein, a stationary platen, pins mounted thereon that are adapted to engage with the ends of said bar which pins limit the forward movement of the bar when it is carried forward by the platen and channel, the pins on the frame being adapted to limit the backward movement of the bar.

4. In a press, the combination of a stationary frame, a platen moving thereon, pins mounted on the frame and extending through the platen, a channel mounted on the platen, a bar carried between the channel and the platen and free to move back and forth therein, a stationary platen, pins mounted thereon that are adapted to engage with the ends of said bar which pins limit the forward movement of the bar when it is carried forward by the platen and channel, the pins on the frame being adapted to limit the backward movement of the bar, a bar in front of the channel, dies carried thereon, pins carried on said last named bar, said stationary platen having sockets therein with which the pins on said last named bar are adapted to engage and by which the dies thereon are correctly positioned with reference to the stationary platen.

5. In a press, the combination of a stationary frame, a platen moving thereon, a bar and an angle joined together in front of said platen and carried thereby, dies carried by said bar and angle, said angle having a horizontal member above the bar and extending rearwardly from the dies, feeding mechanism carried thereby, said feeding mechanism being adapted to feed inserts to the dies to be molded into the article formed therein.

6. In a press, the combination of a stationary frame, a platen moving thereon, a bar and an angle joined together in front of said platen and carried thereby, dies carried by said bar and angle, a feeding mechanism carried by said angle adapted to feed inserts to the dies, said feeding mechanism comprising a drum having teeth thereon adapted to engage the inserts and carry them around with the drum, a chute into which said inserts are fed by the drum, said chute extending down and being divided into branches, each of which leads to a die.

7. In a press, the combination of a stationary platen having feeding tubes extending horizontally therethrough, each of said tubes having an opening in the top thereof near one end thereof, a stationary chute above each of said openings, a slide valve in each chute near the lower end thereof closing said chute, a sliding hopper above each chute adapted to slide back and forth across the top of the chute, said hopper being adapted to fill the chute while the slide valve closes the chute.

8. In a press, the combination of a stationary platen having feeding tubes extending horizontally therethrough, each of said tubes having an opening in the top thereof near one end thereof, a stationary chute above each of said openings, a slide valve in each chute near the lower end thereof closing said chute, a sliding hopper above each chute adapted to slide back and forth across the top of the chute, said hopper being adapted to fill the chute while the slide valve closes the chute, means for moving the hoppers away from the chutes, means for opening the slide valves after the hoppers have been moved away from the chutes.

9. In a press, the combination of a stationary platen having feeding tubes extending horizontally therethrough, each of said tubes having an opening in the top thereof near one end thereof, a stationary chute above each of said openings, a slide valve in each chute near the lower end thereof closing said chute, a sliding hopper above each chute adapted to slide back and forth across the top of the chute, said hopper being adapted to fill the chute while the slide valve closes the chute, means for moving the hoppers away from the chutes, a moving platen, said slide valves being connected thereto, means for causing said platen to move to open said slide valves after the hoppers have been moved away from the chutes, plungers carried on said moving platen, means for thereafter moving the platen in the reverse direction to push the material through the feeding tubes and close the valves.

10. In a press, the combination of a stationary platen having feeding tubes extending horizontally therethrough, each of said tubes having an opening in the top thereof near one end thereof, a stationary chute above each of said openings, a slide valve in each chute near the lower end thereof closing said chute, a sliding hopper above each chute adapted to slide back and forth across the top of the chute, said hopper being adapted to fill the chute while the slide valve closes the chute, means for moving the hoppers away from the chutes, a moving platen above the stationary platen, plungers carried thereon adapted to engage in said chutes, means for pushing the moving platen and its plungers down after the slide valves have been opened, said plungers being adapted to push the material down through the chutes into the feeding tubes.

11. In a press, the combination of a stationary platen having feeding tubes extending horizontally therethrough, each of said tubes having an opening in the top thereof near one end thereof, a stationary chute above each of said openings, a slide valve in each chute near the lower end thereof closing said chute a sliding hopper above each chute adapted to slide back and forth across the top of the chute, said hopper being adapted to fill the chute while the slide valve closes the chute, means for moving the hoppers away from the chutes, a moving platen above the stationary platen, plungers carried thereon adapted to engage in said chutes, means for pushing the moving platen and its plungers down after the slide valves have been opened, said plungers being adapted to push the material through the chutes into the feeding tubes, plungers adapted to thereafter push the material through the feeding tubes and means for moving said plungers.

12. In a press, the combination of a stationary platen having feeding tubes extending horizontally therethrough, each of said tubes having an opening in the top thereof near one end thereof, said opening being adapted to receive the material to the molded, a vertically moving platen above said stationary platen plungers carried on said moving platen, said plungers being adapted to push material into said openings in the top of the tubes and then move out therefrom, a horizontally moving platen in either side of said stationary platen, dies carried on one of said horizontally moving platens, said platen being adapted to push the dies carried thereby against the stationary platen so as to connect with the feeding tubes, plungers carried on the other horizontally moving platen adapted to push the material through the feeding tubes into the dies and hold it therein under pressure.

13. In a press, the combination of a stationary platen having feeding tubes extending horizontally therethrough, each of said tubes having an opening in the top thereof near one end thereof, said opening being adapted to receive the material to be molded, a vertically moving platen above said stationary platen plungers carried on said moving platen, said plungers being adapted to push material into said openings in the top of the tubes and then move out therefrom, a horizontally moving platen in either side of said stationary platen, dies carried on one of said horizontally moving platens, said platen being adapted to push the dies carried thereby against the stationary platen so as to connect with the feeding tubes, plungers carried on the other horizontally moving platen adapted to push the material through the feeding tubes into the dies and hold it therein under pressure, means for moving said platens in the order named.

ROBERT C. BICKERSTAFF.